(12) United States Patent
Julin

(10) Patent No.: US 6,212,372 B1
(45) Date of Patent: Apr. 3, 2001

(54) METHOD IN MOBILE TELEPHONE SYSTEMS IN WHICH A SUBSCRIBER IDENTITY MODULE (SIM) IS ALLOCATED AT LEAST TWO IDENTITIES WHICH ARE SELECTIVELY ACTIVATED BY THE USER

(75) Inventor: Tomas Julin, Stockholm (SE)

(73) Assignee: Comvik GSM AB, Hagersten (SE)

( * ) Notice: Subject to any disclaimer, the term of this patent is extended or adjusted under 35 U.S.C. 154(b) by 0 days.

(21) Appl. No.: 08/781,612

(22) Filed: Jan. 9, 1997

Related U.S. Application Data

(63) Continuation of application No. 08/162,164, filed on Apr. 20, 1994, which is a continuation of application No. PCT/SE92/00227, filed on Apr. 8, 1992.

(30) Foreign Application Priority Data

Apr. 12, 1991 (SE) .................................................... 9101105

(51) Int. Cl.[7] .................................................... H04M 3/00
(52) U.S. Cl. .................... 455/418; 379/267; 340/285.34; 340/825.32; 455/434
(58) Field of Search ..................................... 455/418, 434

(56) References Cited

U.S. PATENT DOCUMENTS

| | | |
|---|---|---|
| 3,581,019 | 5/1971 | Ryan ........................................ 179/41 |
| 4,399,330 | 8/1983 | Kuenzel .................................... 179/2 |
| 4,691,339 * | 9/1987 | Redman et al. ........................ 379/62 |
| 4,734,928 | 3/1988 | Weiner et al. ........................ 379/59 |
| 4,736,094 | 4/1988 | Yoshida ................................ 235/379 |
| 4,837,422 | 6/1989 | Dethloff et al. ...................... 235/380 |
| 4,868,846 | 9/1989 | Kemppi ................................ 379/144 |
| 4,868,849 * | 9/1989 | Tamaoki ................................ 379/357 |
| 4,928,001 | 5/1990 | Masada ................................ 235/380 |
| 5,020,091 * | 5/1991 | Krolopp et al. ........................ 379/58 |

(List continued on next page.)

FOREIGN PATENT DOCUMENTS

| | | |
|---|---|---|
| 2147638 | 4/1972 | (DE) . |
| 3736190 | 5/1988 | (DE) . |
| 3809028 | 9/1988 | (DE) . |

(List continued on next page.)

OTHER PUBLICATIONS

Ballard, Issenmann, "Digital Cellular Mobile Radio System ECR900", European Transactions on Telecommunications, Jan. 1990.*

European Telecommunications Standards Institute "Vocabulary in a GSM PLMN", Jan. 23, 1990.*

Williams, "Cellular Industry Fights Fraud", Telephony, Feb. 27, 1995.*

KIM, KIM, KIM, "Integrated Number Portability Protocols for Wire and Wireless Network", International Conference on Communications Technology, Oct. 1998.*

Mazziotto, "The Subscriber Identity Module for the European Digital Cellular System GSM," Fourth Nordic Seminar on Digital Mobile Radio Communications DMR IV, Oslo, Norway. Jun. 26–28, 1990, pp. 1–9.

*Primary Examiner*—Daniel S. Hunter
(74) *Attorney, Agent, or Firm*—Christie, Parker & Hale, LLP

(57) ABSTRACT

An apparatus and a method for providing at least two identities to a subscriber unit of a mobile telephone system. A subscriber identity module (SIM) is provided which is inserted into the subscriber unit for selectively activating an identity. The module may be activated through a keypad on the subscriber unit allowing a subscriber to enter a code for selecting a specific identity, or it may be a card having a separate program circuit on either end so that when inserted into the unit with its first end, a first identity is activated, and when inserted into the unit with its second end, a second identity is activated. Each selected identity may be allocated a separate directory number or all identities may be allocated a single number.

16 Claims, 5 Drawing Sheets

U.S. PATENT DOCUMENTS

| | | | |
|---|---|---|---|
| 5,249,302 | * 9/1993 | Metroka et al. | 455/11.1 |
| 5,276,311 | 1/1994 | Hennige | 235/380 |
| 5,301,234 | * 4/1994 | Mazziotto et al. | 380/23 |
| 5,353,328 | * 10/1994 | Jokimies | 379/58 |
| 5,371,493 | * 12/1994 | Sharpe et al. | 340/825.34 |
| 5,898,923 | * 4/1999 | Gaasvik et al. | 455/434 |

FOREIGN PATENT DOCUMENTS

| | | |
|---|---|---|
| 3736854 | 5/1989 | (DE) . |
| 3906349 | 9/1990 | (DE) . |
| 0378450 | 7/1990 | (EP) . |
| 0607767 * | 7/1994 | (EP) . |
| 2627880 | 9/1989 | (FR) . |
| 1366372 | 9/1974 | (GB) . |

* cited by examiner

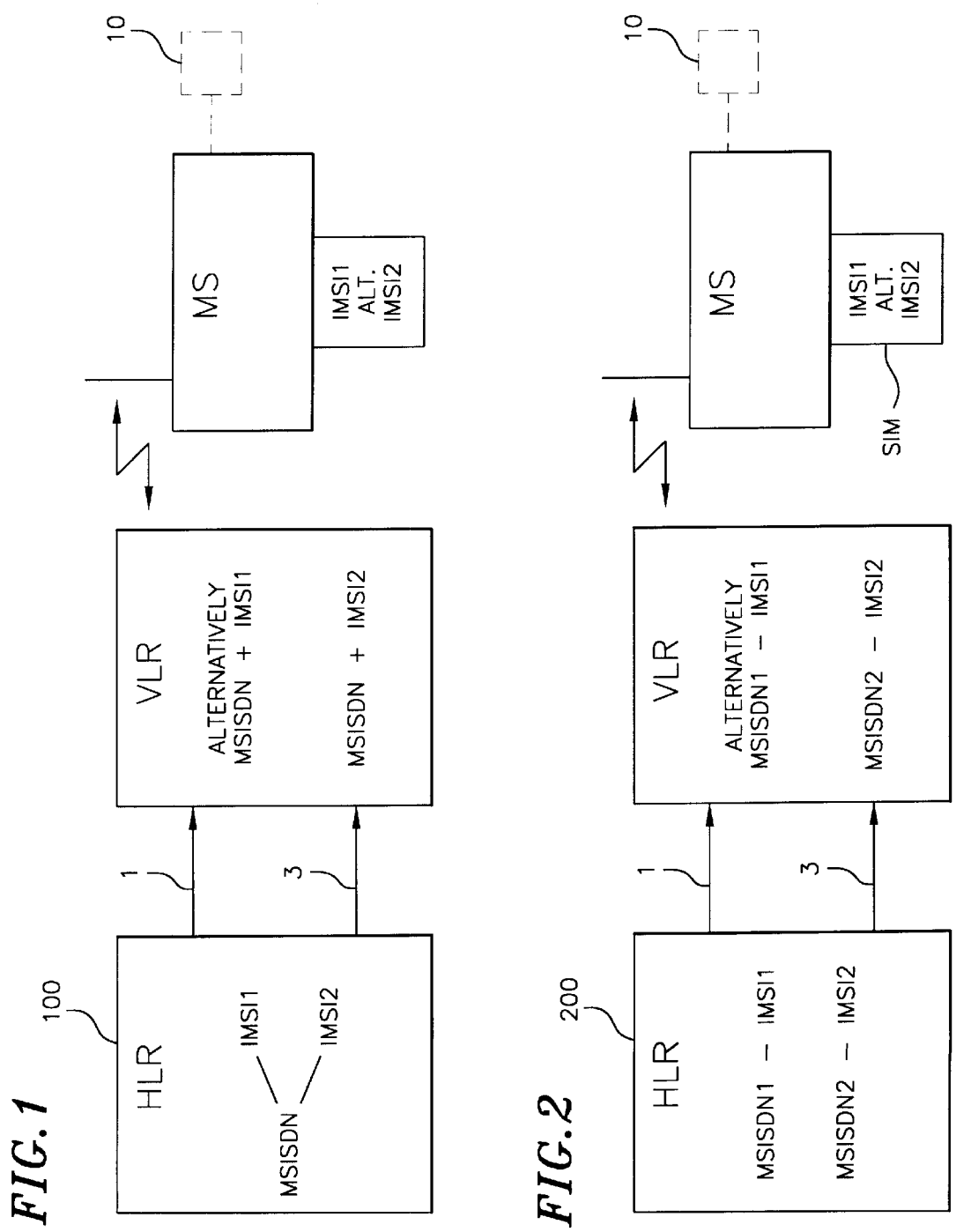

METHOD IN MOBILE TELEPHONE SYSTEMS IN WHICH A SUBSCRIBER IDENTITY MODULE (SIM) IS ALLOCATED AT LEAST TWO IDENTITIES WHICH ARE SELECTIVELY ACTIVATED BY THE USER

CROSS-REFERENCE TO RELATED APPLICATION

This is a continuation of application Ser. No. 08/162,164, filed Apr. 20, 1994 now abandoned, which is a continuation of PCT/SE92/00227 filed Apr. 8, 1992.

FIELD OF THE INVENTION

The present invention relates to telephone systems, preferably mobile telephone systems, in which the subscriber units, preferably mobile units or stations, are controlled by a subscriber identity module. More specifically, the invention concerns a method in such a telephone system, wherein the subscriber identity module is utilised in a new way, as well as a subscriber identity module especially suited for use in connection with the method.

The invention is advantageously applied to a telephone system of the GSM type (Global System for Mobile Communication). Although the invention is by no means restricted to such an application, it will be described hereinafter with reference to a system of this type.

BACKGROUND OF THE INVENTION

GSM is a uniform, intelligent digital mobile telephone system which is not geographically confined to a single country. A subscriber may use any subscriber unit (Mobile Station—MS) by controlling it with the aid of a subscriber identity module (SIM), which may be an active card or a plug-in unit inserted in the subscriber unit and producing the subscriber's identity (IMSI) which is allocated to a directory number (Mobile Station International ISDN number—MSISDN). Information on IMSI and MSISDN is stored, together with other information relating to the subscriber, in a home database (Home Location Register—HLR) with the operator of the network including the subscriber. The system comprises visitor databases (Visitor Location Register—VLR) and switches (Mobile Services Switching Centre—MSC) Information on an activated subscriber unit MS is temporarily stored in the VLR pertaining to the area of location of the subscriber unit MS.

Since the above concepts, as well as the design and operation of the system as a whole, are subjected to extensive standardisation, no detailed description seems required here.

Systems of the above type are widely used for service calls, but also to some extent for private calls. Distributing the costs for service and private calls usually cause problems or involves extra work.

One and the same subscription can also be used by different people, e.g. within one and the same company. Also in this case, distributing the costs among the different people concerned may cause problems or involve extra work.

OBJECT OF THE INVENTION

The object of the present invention is to eliminate the above inconveniences and also in other respects enable a more flexible use of subscriptions and subscriber identity modules.

SUMMARY OF THE INVENTION

This object is achieved by a method and a subscriber identity module having the distinctive features recited in the appended claims.

The invention is thus based on the insight that a subscriber identity module can be allocated at least two different identities which are selectively activable by the user. As will be appreciated, there may be two identities, e.g. a service identity and a private identity, which belong to the same user, which seems to be the currently preferred case. However, different identities might also be used, which correspond to several potential users of the subscriber identity module.

Preferably, only one identity can be activated at a time, i.e. a change of identity means that the previously activated identity must first be deactivated before the new identity can be regarded as activated. The associated home database is suitably made to store information on which identity is activated, so that calls can be set up, cost information stored and so forth in a correct way.

The subscriber identity module can be so designed that the selective identity activation, i.e. the selection of identity function in the subscriber identity module, can be carried out with the aid of keys or the like provided on the subscriber unit, or with the aid of special means provided on the subscriber identity module, e.g. so-called touch contacts when the module is an active card. The activation may then, for instance, take place in connection with the input of a so-called PIN code. In that case, each identity can be allocated a special code. This means that a number of different users (corresponding to the number of different identities) can share the subscriber identity module employed. It is also possible to have a user's PIN code supplemented with code elements for selecting the desired identity (for instance, service or private).

In a preferred embodiment of the subscriber identity module according to the invention, the module is an active card designed to be inserted in the subscriber unit in two different positions, preferably with one or the other end first, each position corresponding to an allocated identity. This enables an embodiment in which each identity function is clearly marked on the card, which thus becomes easy to handle. A change of identity is performed simply by taking out the card and then again inserting it, now in the other position, e.g. when switching from a service call to a private call, or vice versa.

BRIEF DESCRIPTION OF THE DRAWINGS

FIG. 1 is a highly schematic diagram illustrating an embodiment of the invention.

FIG. 2, which is a diagram similar to that of FIG. 1, illustrates another embodiment of the invention.

DETAILED DESCRIPTION

Figure 8:
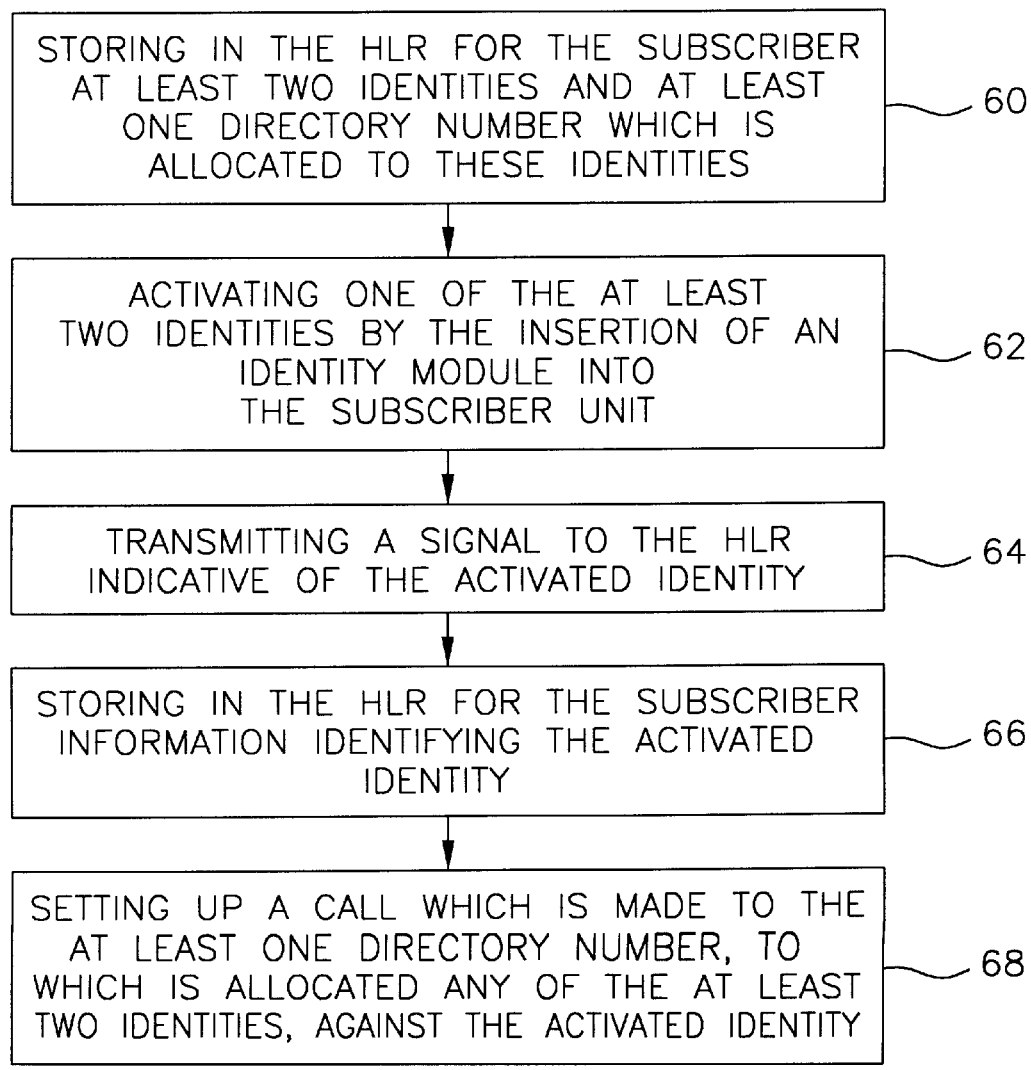
FIG. 8 is flow chart illustrating a method for setting up calls to one of a plurality of subscriber identities in a digital telephone system.

A summary of the present invention is depicted in FIG. 8 and is provided later on in this specification. Reference to FIG. 8 is made throughout the specification.

It will be appreciated that the subscriber identity module according to the invention may be provided with specially programmed circuits 13, 17 (FIG. 6) which contain either integrated identity functions or separate, 'parallell' identity functions. With an active card having two different positions, the latter design is readily achieved by the provision of a first circuit 13 at one end of the card end a second circuit 17 at the other end of the card, all in compliance with current standards for such cards in respect of the positioning of the contact means, and so forth. Thus, one side of the card is able to identify one identity, while the other side identifies the other identity.

As to the allocation of directory numbers in a home database, there are different alternatives in accordance with the invention.

In a first alternative, as depicted in FIG. 1, the different identities of the subscriber identity module are allocated to one and same directory number at the home data base (HLR) (FIG. 8, block 60). The home database is designed to set up calls against and register cost information etc. for the current combination of directory number and identity. For properly performing this, the home database should be informed of which identity is activated. This can be done in that only one identity can be activated at a time, so that when a 'new' identity is activated, the preceding identity is always deactivated and the home database informed thereof. Such deactivation may, for instance, be performed by using a function of the type 'Cancel IMSI' (FIG. 3), which is employed in GSM-type systems. Such deactivation means that information on this identity is cancelled from the visitor database employed, and that the home database is always informed when the identity is again activated.

An incoming call is set up against the activated identity, controlled by the information in the home database 100.

If there is no information on the activated identity, an incoming call can first be set up against a selected identity among the possible identities (e.g., IMSI 1, IMSI 2). If the selected identity is found to be non-activated, the call can be transferred so as to be set up against the next possible identity etc., in accordance with the information in the home database.

It should be observed that a network operator can modify the function of his home database without coming into conflict with the standard of e.g. a system of GSM type.

In a second alternative, as depicted in FIG. 2, the different identities of the subscriber identity module are each allocated to a unique directory number. Of these directory numbers, one particular number is the subscriber's external telephone number, while the other number(s) is (are) only used in the home database 200 and may be unknown to the subscriber and to the public. It is convenient also in this case that only one identity can be activated at a time and that the home database is informed thereof, e.g. as in the first alternative (see FIG. 3).

When there is an outgoing call, the selected and activated identity is used together with the allocated directory number in conventional manner.

Figure 7:
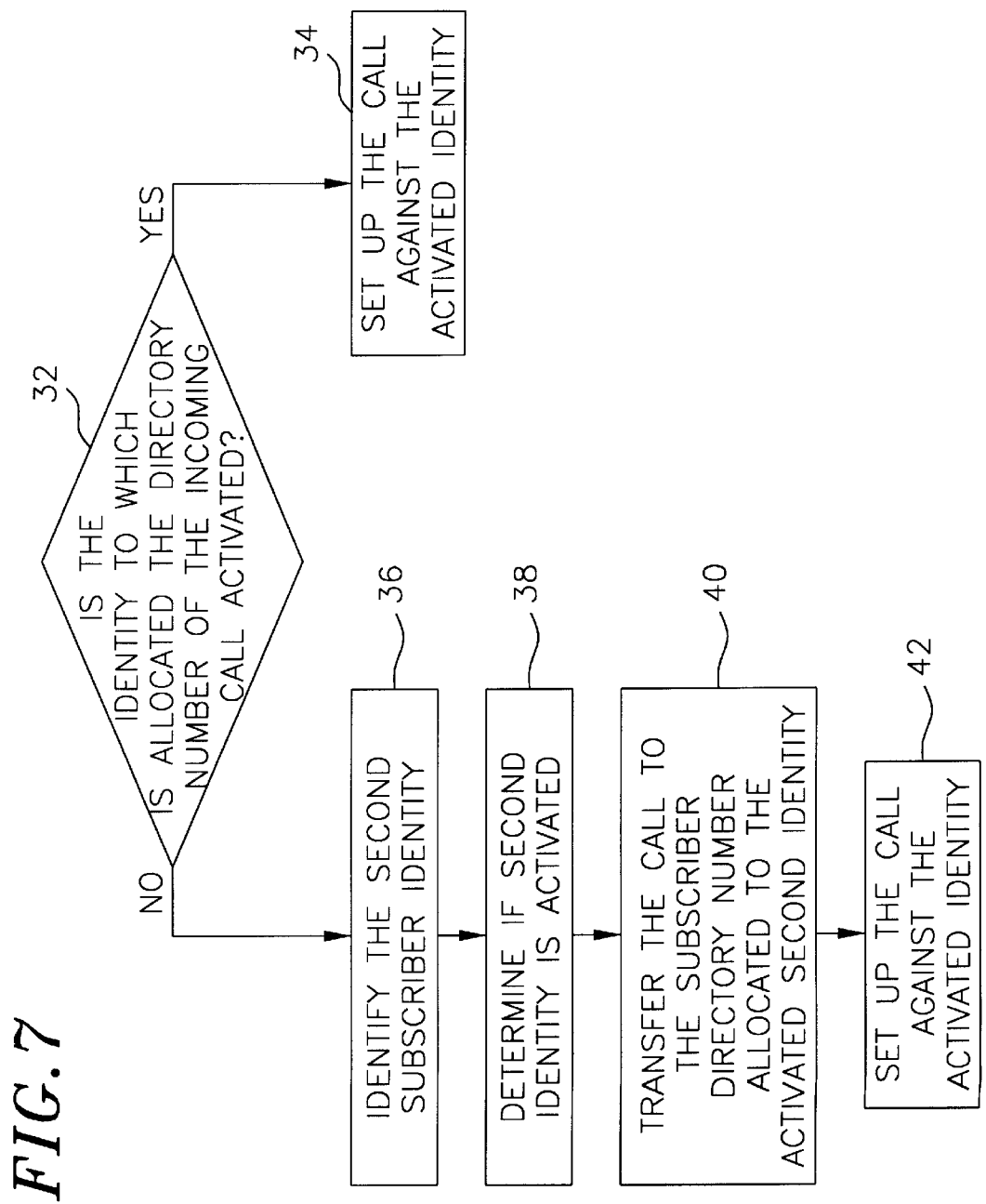
FIG. 7 is a flow chart illustrating a method for transferring a call to another directory number linked to an active subscriber identity and setting up the call against the activated identity when the identity allocated to the call directory number is not activated.

Incoming calls are always set up against the identity allocated to the special directory number, as shown in block 34 of FIG. 7, provided that this identity is activated (block 32). If not, the call can be transferred to the subscriber's next directory number with associated identity (block 36–42). It will be appreciated that this transfer can be performed directly, without the call being set up against the first-mentioned identity, if the home database knows which identity is activated.

Figure 4:
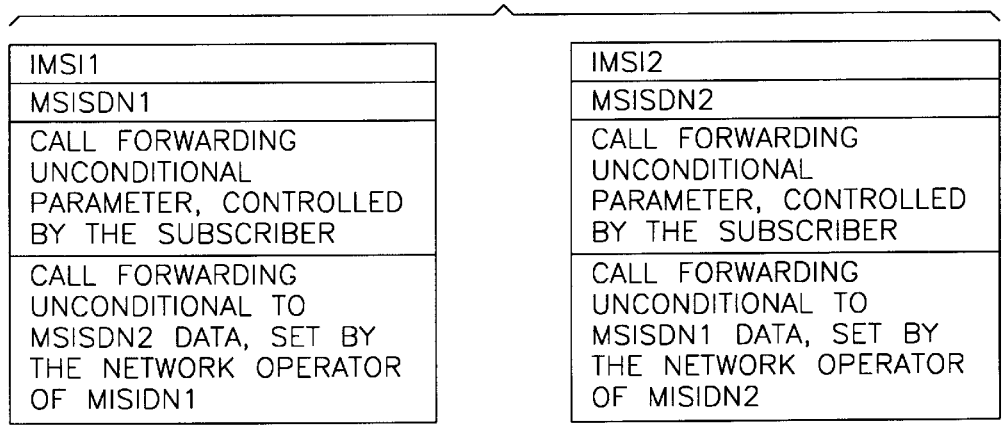
FIG. 4 illustrates a supplementary addition to a home database in accordance with an embodiment of the invention.
Figure 5:
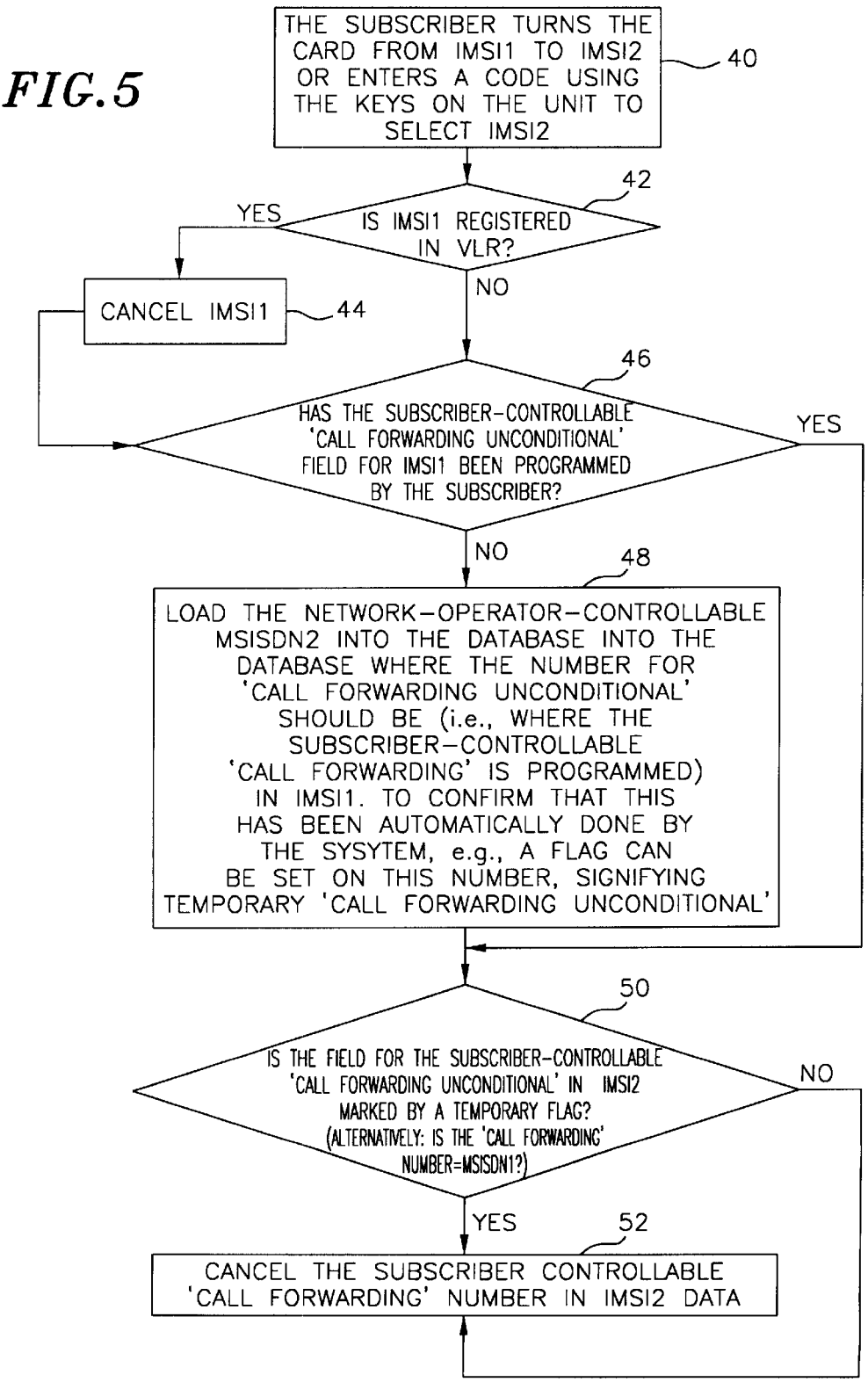
FIG. 5 is a flow chart illustrating a mode of using a 'Call Forwarding Unconditional' function in accordance with the invention.

For call transfer, use may, according to the invention, advantageously be made of a function of the type 'Call Forwarding Unconditional' (CFU), which is a well-known standard function adapted to be controlled by the subscriber as shown in FIGS. 4 and 5. By adding a corresponding function, controlled by the network operator, to the home database, one or more of the subscriber's directory numbers can be supplemented for direct transfer in the event of the associated identity being non-activated and provided that the subscriber has not himself made any arrangements for other direct call transfer, as shown in FIG. 5.

In a third alternative, which is a further development of the second alternative, two of the subscriber's directory numbers are external telephone numbers, of which one suitably is a service number and the other is a private number. Informing of the activated identity and the direct call transfer can be performed as in the second alternative.

Thus, it will be appreciated that the present invention provides several different options for a subscriber as to different identities and amounts of external telephone numbers, while using a single subscriber identity module.

The invention will be illustrated in more detail below with the aid of non-restricting embodiments, reference being made to the accompanying drawings.

FIG. 1 schematically illustrates how an embodiment of the invention can be implemented in a mobile telephone system of the GSM type. The home database HLR and the visitor database VLR communicate with one another, as indicated by the arrows 1 and 3. The visitor database VLR is in wireless communication with the mobile station MS, which is controlled by a SIM card which is activable to give the identity IMSI 1 or the identity IMSI 2. The directory number MSISDN corresponds to these identities. Information on MSISDN and the linkage to the two identities IMSI 1 and IMSI 2 are stored in the home database HLR.

When IMSI 1 or IMSI 2 is activated by means of the SIM card in the mobile station MS (FIG. 8, block 62), information thereon is signalled to the home database HLR (FIG. 8, block 64), which transmits information on the current combination MSISDN-IMSI 1, or MSISDN-IMSI 2, to VLR in customary manner. Then, the call is set up in the usual way in consideration of the selected combination.

FIG. 2 schematically illustrates another embodiment of the invention, in which each identity IMSI 1 and IMSI 2 is allocated to a directory number MSISDN 1 and MSISDN 2, respectively, which both are external telephone numbers. For the activated combination MSISDN-IMSI, the call is set up etc. in customary manner.

Figure 3:
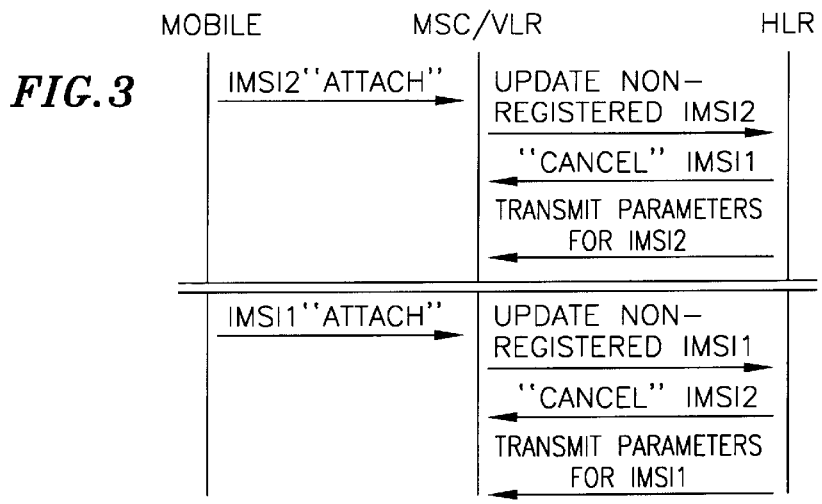
FIG. 3 is a highly schematic diagram illustrating the information flow occurring when an identity is activated and deactivated in accordance with an embodiment of the invention.

FIG. 3 illustrates the essential steps in the information flow that may be used for ensuring that the home database HLR is informed of which of the identities IMSI 1 and IMSI 2 is activated.

In an alternate embodiment, a module storing a plurality of identities is used. The subscriber can select between these identities by keying in a code with the aid of keys 10 (FIGS. 1 and 2) located on the subscriber unit.

Alternatively, the code may be entered through touch contacts (not shown) located on the module when the module is an active card.

In the initial position (at the top), IMSI 1 is assumed to have been activated at a prior time by the insertion of the SIM card with one end first into the mobile station. Now, the user pulls out the card and inserts it again with the other end first in order to activate IMSI 2. Then, IMSI 2 is signalled to the visitor database VLR which, noting that the IMSI is a non-registered one, transmits updating signals to the home database HLR, which stores information on IMSI 2 being activated (FIG. 8, block 66), and deactivates IMSI 1 by emitting a signal 'Cancel IMSI 1,' as shown in FIGS. 3 and 5. Thus, the temporary activation of IMSI 1 is cancelled from the current visitor database VLR that belongs to the area of location of the mobile station MS. Thereafter, data on IMSI 2 is transmitted to the visitor database. The call can now be set up by using the combination MSISDN 2-IMSI 2 (FIG. 8, block 68). When the user once again turns the SIM card, i.e. changes identities, a corresponding activation of IMSI 1 and a corresponding deactivation of IMSI 2 take place.

When there is an incoming call to the directory number whose identity is not activated, the call is transferred directly to the other directory number by using 'Call Forwarding Unconditional'. To this end, the home database is extended with one field for each directory number, as illustrated in FIG. 4. The added field is the one at the very bottom. For MSISDN 1 is here entered: call transfer to MSISDN 2, and vice versa. The call transfer in accordance with these added fields takes place on condition that the user has not himself initiated any transfer of this kind, which in that case would appear from the field immediately above.

The entry of the additional data into the fields of the home database is conveniently carried out simultaneously with the signalling sequence according to FIG. 3. An example of the entry of additional fields is shown in FIG. 5. The subscriber turns the SIM card so as to insert the card's IMSI 2 end into the subscriber unit (block 40). A determination is made at the VLR if IMSI 1 is registered at the VLR (block 42). If it is, IMSI 1 is canceled at the VLR (block 44). After IMSI 1 is canceled or if IMSI 1 is not registered at the VLR, a determination is made if the subscriber Call Forwarding Unconditional IMSI 1 field has been programmed by the subscriber (block 46). If it has not been programmed, the network controllable MSISDN 2 is loaded into the database as the Call Forward Unconditional directory number (block 48). A flag may be set on the IMSI 1 field signifying a temporary call forwarding to MSISDN2 (block 48). If the subscriber has programmed the Call Forwarding Unconditional field or if MSISDN 2 has been down loaded into the database Call Forwarding Unconditional IMSI 1 field, a determination is made if the Call Forwarding Unconditional IMSI 2 field has been marked by a temporary flag or if MSISDN 1 has been set as the call forwarding number in the IMSI 2 field (block 50). If it is, the subscriber controllable call forwarding number (MSISDN 1) is canceled from the IMSI 2 field (block 52). If not, or if MSISDN 1 is canceled from the IMSI 2 field, the entry is completed.

Thus, the 'Call Forwarding Unconditional' can be implemented only if the subscriber has not himself requested such call transfer to another number. In other words, the subscriber may still use this subscriber service as usual. If he does not, the home database HLR will transfer an incoming call from the non-activated combination MSISDN-IMSI to the combination as last activated and registered.

Thus, it will be appreciated that the subscriber has several different options: one or two external telephone numbers; automatic transfer of service calls to the private number, and vice versa; or other personally-controlled call transfer.

Figure 6:
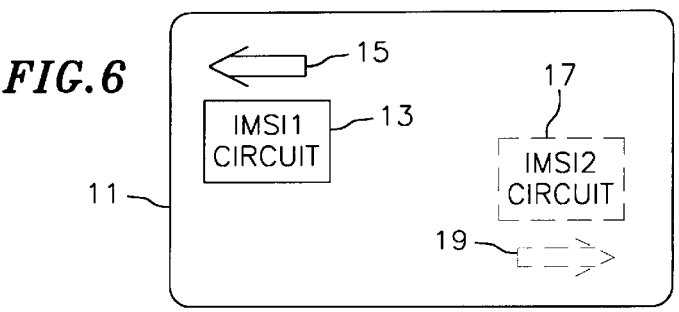
FIG. 6 is a schematic top plan view of an active card modified for use as a subscriber identity module in accordance with an embodiment of the invention.

FIG. 6 schematically illustrates an activated card that has been modified in accordance with the invention so as to provide two identity functions. At one end, the card 11 is equipped in conventional manner with a circuit 13 so as to provide a first identity function when inserted into a mobile station, as indicated by the arrow 15. The illustrated side of the card may be a service side and have a suitable and clear marking to this effect.

The other side of the card is the private side. For this purpose, a second, completely separate circuit 17 is provided at the other end of the card and on the private side, in accordance with current standards for the arrangement of circuits and contacts. When the private side is to be used, the card is inserted with said other end first, as indicated by the arrow 19 on the private side. This side may also have a suitable and clear identity marking.

In an alternate embodiment, a card storing a plurality of identities is used. The subscriber can select between these identities by keying in a code with the aid of keys 10 (FIGS. 1 and 2) located on the subscriber unit. Alternatively, the code may be entered through touch contacts (not shown) located on the card.

What is claimed is:

1. A method for setting up calls to one of a plurality of subscriber identities in a GSM digital mobile telephone system, the system having a home database and a subscriber unit, comprising the steps of:

storing in the home database for a subscriber within one and the same subscription at least two identities and at least one directory number allocated to said identities;

selectively activating a desired identity from the at least two identities by inserting the subscriber identity module into the subscriber unit;

transmitting from the unit to the home database a signal indicative of the activated identity;

storing in the home database for such subscriber information identifying the activated identity responsive to said signal; and setting up a call made to a directory number allocated to one identity of the at least two identities to the activated identity at the home database.

2. A method as recited in claim 1 wherein the subscriber identity module is a card, and wherein the step of selectively activating comprises the step of inserting an end of the card into the unit for selectively activating an identity wherein insertion of a first end of the card activates a first identity causing the unit to produce a signal of the first identity and insertion of a second end of the card activates a second identity causing the unit to produce a signal of the second identity.

3. A method as recited in claim 1 wherein keys are coupled to the unit and wherein the step of selectively activating the desired identity comprises the step of entering a code with the keys corresponding to a desired identity.

4. A method as recited in claim 1 wherein the step of storing in the home database for such subscriber at least two identities comprises the step of storing in the home database for the subscriber at least two identities and a distinct directory number allocated to each of said identities.

5. A method as recited in claim 4 further comprising the step of transferring an incoming call made to a directory number allocated to a non-activated identity to a directory number allocated to the activated identity.

6. A method as recited in claim 5 wherein the step of transferring comprises the steps of:
 identifying a second identity of said subscriber at the home database;
 transferring the call to a directory number assigned to the second identity if said second identity is activated; and
 setting up the call against the activated identity.

7. A method as recited in claim 1 wherein the step of activating comprises the step of activating one identity at a time.

8. A method as recited in claim 1 wherein the step of storing in the home database the activated identity further comprises the steps of:
 storing the information at the home database; and
 transmitting a signal from the home database to a visitor database informing the visitor database of the activated identity.

9. A method as recited in claim 8 further comprising the step of deactivating a previously activated identity when a signal informing the visitor database of a new selected identity is transmitted.

10. A method as recited in claim 9 wherein the step of deactivating comprises the steps of:
 transmitting a signal from the subscriber unit informing the visitor database of a new selected identity;
 sending a signal from the visitor database informing the home database of the new selected identity;
 storing in the home database the new activated identity;
 transmitting a signal to the visitor database from the home database to cancel the previously selected identity, deactivating the identity; and
 transmitting a signal from the home database to the visitor database informing the visitor database of the new activated identity.

11. A method as recited in claim 1 wherein the step of storing in the home database the activated identity comprises the step of storing information about the selectively activated identity at the home database.

12. A method of setting up calls to one of a plurality of subscriber identities in a digital mobile telephone system, the system having a home database, a visitor database in communication with the home database and a subscriber unit for use with a removably insertable subscriber identity module, the method comprising the steps of:
 storing in the home database for a subscriber first and second identities and a separate directory number allocated to each of the two identities;
 selectively activating a first identity from the two identities by inserting the subscriber identity module into the subscriber unit;
 transmitting to the home database a signal indicative of the activated first identity;
 storing in the home database responsive to said signal information identifying the activated identity for such a subscriber;
 determining if the second identity is registered at the visitor database;
 canceling the second identity at the visitor database, if the second identity is registered at the visitor database;
 determining if the subscriber has set a call forwarding number in a Call Forwarding Unconditional field designated for the second identity at the home database;
 loading the directory number allocated to the selected first identity into the Call Forwarding Unconditional field designated for the second identity if the subscriber has not set a call forwarding number in said field designated for the second identity;
 canceling the call forwarding number stored in the Call Forwarding Unconditional field designated for the first identity in the home database if such call forwarding number is the directory number allocated to the second identity; and
 transferring a call made to a directory number allocated to the second identity, to the directory number stored in the Call Forwarding Unconditional field designated for the second identity at the home database.

13. A method as recited in claim 12 further comprising the step of setting up a flag on the Call Forwarding Unconditional field designated for the second identity when the directory number allocated to the first identity has been downloaded in such field, and wherein the step of canceling the call forwarding number comprises the step of canceling the directory number stored in the Call Forwarding Unconditional field for the selectively activated first identity if the Call Forwarding Unconditional field designated for the first identity is marked by a flag.

14. A method of setting up calls in a digital mobile telephone system, the system having a home database and subscriber units, a subscriber unit being controlled by a subscriber identity module, the method comprising:
 allocating at least two identities to a subscriber identity module within one and the same subscription;
 allocating said at least two identities to one and the same directory number in the home database;
 selectively activating an identity of said at least two identities in a subscriber unit controlled by said subscriber identity module;
 sending information to the home database identifying which identity is activated; and
 setting up a call made to said directory number to the activated identity as identified by said information in the home database.

15. A method of setting up calls in a digital mobile telephone system, the system having a home database and subscriber units, a subscriber unit having an insertable subscriber identity module, the method comprising:
 allocating at least two identities to a subscriber identity module within one and the same subscription;
 allocating each of said at least two identities to one of a plurality of unique directory numbers in the home database, one of said unique directory numbers being the subscribers external telephone number;
 selectively activating one identity of said at least two identities allocated to said subscriber identity module;
 sending information to the home database identifying the activated identity; and
 setting up an incoming call, responsive to the information in the home database, to the unique directory number being the subscriber's external telephone number when the identity corresponding to the unique directory number is the selectively activated identity, and transferring the call to a next directory number of said unique directory numbers when the identity corresponding to the unique number is not activated.

16. A method of setting up calls in a digital mobile telephone system, the system having a home database and subscriber units, a subscriber unit being controlled by a subscriber identity module, the method comprising:
 allocating two identities to a subscriber identity module within one and the same subscription;

allocating each said two identities to a different unique directory number in the home database, the unique directory numbers both being external telephone numbers for the subscriber;

selectively activating one identity of said two identities in a subscriber unit controlled by said subscriber identity module;

sending information to the home database identifying the activated identity; and setting up an incoming call, responsive to the information in the home database, made to one of said unique directory numbers when the identity corresponding to said unique directory number is the selectively activated identity, and transferring the call to the other unique directory number of said two unique directory numbers when the identity corresponding to the incoming call unique directory number is not activated.

* * * * *